(12) United States Patent
Mager et al.

(10) Patent No.: US 11,305,474 B2
(45) Date of Patent: Apr. 19, 2022

(54) METHOD AND SYSTEM FOR MAKING A PLASTIC FILM

(71) Applicant: Reifenhaeuser GmbH & Co. KG Maschinenfabrik, Troisdorf (DE)

(72) Inventors: Jens Mager, Cologne (DE); Andreas Roesner, Bonn (DE); Christian Stelter, Ingelheim (DE); Asmir Vodencarevic, Erlangen (DE); Thomas Fett, Troisdorf (DE); Mark Hilgers, Troisdorf (DE); Christoph Lettowsky, Aachen (DE)

(73) Assignee: REIFENHAEUSER GMBH & CO. KG. MASCHINENFABRIK, Troisdorf (DE)

( * ) Notice: Subject to any disclaimer, the term of this patent is extended or adjusted under 35 U.S.C. 154(b) by 124 days.

(21) Appl. No.: 15/786,688

(22) Filed: Oct. 18, 2017

(65) Prior Publication Data

US 2018/0104883 A1    Apr. 19, 2018

(30) Foreign Application Priority Data

Oct. 18, 2016 (DE) .......................... 102016119869.2

(51) Int. Cl.
*B29C 48/92* (2019.01)
*B29C 48/08* (2019.01)
(Continued)

(52) U.S. Cl.
CPC .......... *B29C 48/92* (2019.02); *B29C 48/0018* (2019.02); *B29C 48/08* (2019.02);
(Continued)

(58) Field of Classification Search
CPC ......... B29C 48/92; B29C 48/08; B29C 48/10; B29C 48/28; B29C 48/0018;
(Continued)

(56) References Cited

U.S. PATENT DOCUMENTS

| 2,156,895 | A | * | 5/1939 | Godat | ..................... B29C 48/92 |
|---|---|---|---|---|---|
| | | | | | 425/141 |
| 4,514,812 | A | * | 4/1985 | Miller | ..................... B29C 48/09 |
| | | | | | 700/196 |

(Continued)

FOREIGN PATENT DOCUMENTS

| DE | 2831212 A1 | * | 1/1980 | ............. B29C 48/92 |
|---|---|---|---|---|
| DE | 10047836 A1 | * | 4/2002 | ........... G01B 9/0209 |
| EP | 0516992 A1 | * | 12/1992 | ............. B29C 48/10 |

OTHER PUBLICATIONS

EP-0,516,992 (Windmoller) Dec. 1992: (online machine translation), [retrieved on Jul. 30, 2019], retrieved from: Google Patents (Year: 1992).*

(Continued)

*Primary Examiner* — Kelly M Gambetta
*Assistant Examiner* — Andrés E. Behrens, Jr.
(74) *Attorney, Agent, or Firm* — Andrew Wilford

(57) ABSTRACT

A plastic film of a thermoplastic synthetic resin is made in a film-making system by extrusion from a die of an extruder. First the plastic is melted and extruded from the die as a tube or web that is, typically after cooling and stretching, formed into a package. At least one reference parameter is provided, and, during continuous operation of the system, two input parameters different from the reference parameter are measured by respective measuring devices An output is determined from these reference parameters and is compared with the reference parameter.

11 Claims, 1 Drawing Sheet

(51) Int. Cl.
*B29C 48/10* (2019.01)
*B29C 48/28* (2019.01)
*B29C 48/355* (2019.01)
*B29C 48/00* (2019.01)
B29C 48/03 (2019.01)
B29K 101/12 (2006.01)
B29L 7/00 (2006.01)
B29L 23/00 (2006.01)

(52) U.S. Cl.
CPC .............. *B29C 48/10* (2019.02); *B29C 48/28* (2019.02); *B29C 48/355* (2019.02); *B29C 2948/926* (2019.02); *B29C 2948/92019* (2019.02); *B29C 2948/92038* (2019.02); *B29C 2948/92085* (2019.02); *B29C 2948/92095* (2019.02); *B29C 2948/92123* (2019.02); *B29C 2948/92152* (2019.02); *B29C 2948/92209* (2019.02); *B29C 2948/92685* (2019.02); *B29C 2948/92761* (2019.02); *B29K 2101/12* (2013.01); *B29L 2007/008* (2013.01); *B29L 2023/00* (2013.01)

(58) Field of Classification Search
CPC ........... B29C 2948/92209; B29C 2948/92038; B29C 2948/92095; B29C 2948/92152; B29C 2948/92685; B29C 2948/92085; B29C 2948/926; B29C 2948/92123; B29C 2948/92019; B29C 2948/92761; B29K 2101/12; B29L 2007/008; B29L 2023/00

See application file for complete search history.

(56) References Cited

U.S. PATENT DOCUMENTS

| | | | | |
|---|---|---|---|---|
| 4,613,471 | A * | 9/1986 | Harris | B29C 44/60 |
| | | | | 264/40.1 |
| 4,699,580 | A * | 10/1987 | Co | B29C 48/08 |
| | | | | 425/72.1 |
| 5,258,148 | A | 11/1993 | Sensen | |
| 2009/0045555 | A1* | 2/2009 | Kulgemeyer | B29C 48/92 |
| | | | | 264/563 |
| 2021/0107202 | A1* | 4/2021 | Rodriguez | C08F 10/02 |

OTHER PUBLICATIONS

DE-2,831,212 (Bradford) Jan. 1980: (online machine translation), [retrieved on Jul. 30, 2019], retrieved from: Espacenet (Year: 1980).*

DE-10,047,836 (Bernd) Apr. 2002: (online machine translation), [retrieved on Jul. 29, 2019], retrieved from: Espacenet (Year: 2002).*

EP-0,516,992 (Sensen) Dec. 1992 (online machine translation), [Retrieved on Mar. 25, 2020], Retrieved from: Espacenet (Year: 1992).*

"Material Selection." Wikipedia, Wikimedia Foundation, Aug. 5, 2016, en.wikipedia.org/wiki/Material_selection. (Year: 2016).*

* cited by examiner

METHOD AND SYSTEM FOR MAKING A PLASTIC FILM

FIELD OF THE INVENTION

The invention relates to a method of making a plastic film of a thermoplastic synthetic resin in a film-making system. More particularly, the invention relates to a method of making a blow-extrusion film of thermoplastic plastic in a blow-extrusion film system by extrusion from a ring die of a blow head. The invention further relates to a film-making system for making a plastic film of a thermoplastic synthetic resin and having a die for the extrusion of the plastic film and preferably a blow-extrusion film system for making a blow-extrusion film of a thermoplastic synthetic resin, with a ring die of a blow head for the extrusion of a film tube.

BACKGROUND OF THE INVENTION

Such a system work with extrusion from a die, particularly by the extrusion of a film tube through a ring die of a blow head or by extrusion of a film web from a flat film die. The plastic or plastic melt is supplied to the die by at least one extruder, and the film tube or film web is subsequently extruded from the die, preferably cooled by a cooler and wound into a film package or film coil by a winding device.

Methods and systems of the type described above are known in practice in various forms. Known blow-extrusion film systems include devices in which the film tube is blown out by compressed air at a certain blowup rate and is cooled by air. A supply air blower is generally provided for feeding in the air and an exhaust blower is also present for exhausting the air out of the film tube. The film tube is normally removed by a conveyor and is then flattened to form a film web. The flattened tube is then wound in a coiler to form a wound film. During inflation, it is common for the film tube to stretch in the extrusion direction. This can also lead to transverse stretching perpendicular to the extrusion direction.

In continuous operation of such a blow-extrusion film system, irregularities and anomalies may occur in the supply or removal of the blown air or even during air cooling of the tube. Variations in the temperature of the ring die are possible as well. In extreme cases, such irregularities or anomalies may lead to the tearing and/or collapse of the film tube. In particular, such irregularities can result in thin or thick areas in the wound film web that are not desired under the production conditions. This can ultimately lead to an entire wound film being of lower quality and, in extreme cases, needing to be discarded.

In the known blow-extrusion film systems, it is not always possible to easily recognize the variations in the production conditions that are responsible for anomalies and/or malfunctions, nor is it always possible to recognize them in a timely fashion. This applies to various system components of such a blow-extrusion film system. The consequences of this can be particularly serious if a measuring device, for example, for the measurement of air pressure inside the film tube or for the measurement of the temperature of the cooling air or the like, malfunctions. In the currently known systems, it is not possible to sufficiently compensate for such a malfunction of measuring devices and/or measuring sensors, which can lead to serious anomalies or even to a stoppage of the entire blow-extrusion film system and, in such a case, to undesired prolonged downtime.

OBJECTS OF THE INVENTION

In light of this, the object of the invention is to provide a method of the type mentioned at the outset in which the system parameters may be detected in a simple and relatively precise fashion and in which it is possible to detect malfunctions and/or anomalies in a less laborious, more failsafe, and more timely fashion.

The further object of the invention is to provide a corresponding film-making system.

SUMMARY OF THE INVENTION

In order to attain this object, the invention teaches a method of making a plastic film of a thermoplastic synthetic resin in a film-making system by extrusion from a die, in particular by the extrusion of a film tube from a ring die of a blow head or by the extrusion of a film web from a flat film die, with the plastic and/or the plastic melt being delivered to the die by at least one extruder, with the film tube or film web being subsequently extruded out of the die, preferably cooled by a cooler, and wound by a coiler into a film package or a wound film, with a reference parameter being provided such that, in continuous operation of the system, at least two, preferably at least three, input parameters different from the reference parameter are measured by respective measuring devices, with an output parameter corresponding to the reference parameter being determined from the measured input parameters by at least one analysis unit. Comparing the output parameter thus determined with the reference parameter, in particular continuously, lies within the scope of the invention.

According to a particularly preferred embodiment of the invention, in the case of deviation by at least one detected value of the output parameter from the at least one value or measured value of the reference parameter, an anomaly of the output parameter is signaled. Such signaling particularly occurs by a visual and/or acoustic signal. Signaling of the anomaly and/or a corresponding alarm alert via an HMI (human-machine interface) and/or via a cloud connection (by email, SMS, or the like) lies within the scope of the invention. According to a very preferred variant embodiment, the deviation or anomaly is documented, in particular by storage in a memory or an independent memory. Such a memory may be a database, a cloud, or a similar memory. The preferred documentation and/or storage facilitates later analyses and/or mapping.

Upon the detection or signaling of the deviation or anomaly mentioned above, the following reactions are fundamentally possible: the entire film-making system is switched off and/or individual components of the system are switched off and/or components of the system with an adjustment option are adjusted, advantageously in such a way that the measured input parameters and therefore advantageously also the resulting output parameters may be influenced. In this respect, as a function of the detected deviation and/or anomaly, it is preferable for control and/or regulation of the individual system components to occur. For example, as a function of the detection of the deviation or anomaly, the temperature of a tempering device and/or the blowing speed of a blower and/or the opening width of an opening may be controlled with or without feedback.

Within the scope of the invention, the term "parameter" (in particular reference parameter, input parameter, output parameter) refers to a measured value or physical measured value such as, for example, temperature, speed, torque, or the opening width of a gas opening. Within the scope of the invention, "measurement" means the measured value of this parameter and/or this measurement category. Within the scope of the invention, an input parameter corresponding to the reference parameter means that the input parameter and reference parameter both relate to the same measurement category or physical measured value, for example, temperature.

A particularly preferred embodiment of the invention is characterized in that at least one reference parameter or the reference parameter is measured using at least one reference measuring device in a reference operation of the film-making system. Here, "reference operation of the film-making system" particularly refers to the failure-free normal operation of the system. In the method according to the invention, a reference parameter, for example, a temperature, measured in this situation is then compared to the detected or calculated input parameter (detected temperature). According to a recommended embodiment, the measurement of the reference parameter during reference operation of the film-making system occurs as an in-line measurement during a continuous reference operation of the system. However, according to another embodiment, the measurement of the reference parameter use of the reference measurement device may also occur off-line. Such an off-line measurement of the reference parameter is recommended, for example, if the reference parameter is an individual layer thickness in a film laminate, a tensile strength of the film, or the like.

According to another embodiment of the invention, the reference parameter and/or at least one reference parameter may be provided as an experience-based parameter. This means that the reference parameter need not necessarily be measured in the course of the method according to the invention; rather, at least one value or a value of the reference parameter is already present as an experience-based parameter or empirical value. Such an experience-based parameter or empirical value may be determined from previous measurements or be the result of calculations or computations.

It is within the scope of the invention for at least two different input parameters to be measured by measuring devices and for these measured input parameters to be used to calculate an output parameter by an analysis unit. Thus, particularly using measuring devices, input parameters such as temperature, flow rate, blowup rate, and the like may be measured and, from these measurements, at least one output parameter, for example, a layer thickness of the film tube, may be determined using the analysis unit. However, it is also fundamentally possible within the scope of the invention for at least one input parameter to be specified as a fixed or constant system parameter and to be used for the calculation of the output parameter. This fixed, predetermined system parameter or input parameter may, for example, be a geometric value, such as an opening width or cross-sectional area or the like. Nonetheless, in the course of the method according to the invention, at least two input parameters, preferably at least three input parameters (as input parameters with variable measured values), are measured using measurement devices and/or measurement sensors. The input parameter is then calculated from the at least one predetermined input parameter and the other measured input parameters. If the value of the output parameter determined in this fashion deviates from the value/measured value of the reference parameter, the anomaly of the output parameter is detected and preferably signaled. Then, as described above, it is possible to influence the film-making system and/or system components and/or the controls of the film-making system and/or of the system components. The anomaly of the output parameter described above can moreover be attributable to input parameters resulting from measurements made with damaged and/or recalibrated measurement units or sensors.

According to one embodiment of the invention, the at least one reference parameter or reference value of the reference parameter may also be calculated or calculated on the basis of other known parameters. Such a calculation of the reference parameter is advantageous when the measurement of the reference parameter is not possible or not easily possible using a reference measurement device. At least one input parameter being calculated also lies within the scope of the invention. Here as well, the calculation of at least one input parameter is advisable if the measurement of the input parameter is not possible or not easily possible. The relevant input parameter is then calculated using known parameters or status parameters. It is then useful for this calculated input parameter to be included in the calculation of the output parameter. According to one embodiment of the invention, the output parameter may then also be determined from the measured input parameters, optionally from the at least one fixed and predetermined input parameter, and optionally also from at least one calculated input parameter. If the output parameter deviates from the reference parameter, it is then possible to proceed as described above.

According to a very recommended embodiment of the method according to the invention, the analysis may proceed as follows. First, a determination is made as to which data set or data sets of input parameters correspond to the value of the reference parameter measured in failure-free normal operation. During the continuous operation of the system, the current data sets of input parameters that have been measured or calculated are then compared to the data set of input parameters corresponding to the reference value of the reference parameter. If the values are found to correspond or mostly correspond, it is advantageous for no signaling or alarm alert to occur. If a deviation or anomaly is detected, on the other hand, the deviation or anomaly is signaled or a corresponding alarm alert is signaled and/or transmitted.

Within the scope of the method according to the invention, the plastic and/or the plastic melt is supplied to the die, in particular to the ring die or the flat film die, by at least one extruder. In the manufacture and/or coextrusion of a multilayer film, it is advantageous for two or more extruders to be used to supply the corresponding plastic melts. According to a variant embodiment, the plastic and/or molten plastic exiting an extruder is supplied to at least one cleaning screen before entering the die.

According to one embodiment of the invention, the at least one reference parameter or output parameter is a parameter related to the plastic being used selected from the group comprised of material density, bulk density, dosage amount, melt density, feed rate, and material leakage. In such a case, the input parameters to be used or measured in order to obtain the corresponding output parameter are selected from the group comprised of melt pressure, extruder temperature, extruder speed, extruder torque, and melt temperature. Within the framework of the invention, "material density" particularly refers to the density of the plastic or plastics used for making the plastic film. Within the framework of the invention, "bulk density" refers to the density of the plastic and/or plastic granulate used in the system according to the invention, in particular in a hopper located upstream of the extruder. In the context of the invention, "dosage amount" refers to the amount of plastic supplied to the extruder. Moreover, in the context of the invention, "melt density" particularly refers to the density of the plastic melt supplied to the die and "feed rate" particularly refers to the amount of plastic melt supplied to the die. "Melt pressure" and "extruder temperature" particularly refer to the pressure and temperature measured in the extruder, respectively. "Extruder speed" and "extruder torque" refer to the speed and torque of the extruder screw. When, according to a preferred embodiment, the molten plastic is guided through a cleaning screen or through at least one cleaning screen located before the die in the supply direction, the input parameters may be (additionally) selected from the group comprised of melt pressure before the cleaning screen, and power-on hours of the cleaning screen. The "power-on hours of the cleaning screen" may be a fixed, predetermined input parameter, i.e. an input parameter that is not measured in real time.

One embodiment of the invention is characterized in that the material density (of the plastic or plastics) is used as an output parameter and/or reference parameter. This allows any use of an incorrect or unintended raw material to be detected in a timely fashion. Thus, the early detection of production problems attributable to raw materials due to user error and/or incorrect storage and/or batch fluctuations and the resulting processing problems is made possible.

A particularly recommended embodiment of the method according to the invention is characterized in that the film-making system is a film-blowing system in which the plastic film is extruded from the ring die as a plastic tube, in that the film tube is inflated and stretched in the extrusion direction, preferably additionally stretched transverse to the extrusion direction, in that the at least one reference parameter and/or output parameter is at least one parameter from the group comprised of malleability of the film, and tensile strength of the film, and in that the input parameters are selected from the group comprised of blow head temperature or ring die temperature, extruder speed, extruder torque, extruder temperature, extruder pressure, output speed, blowup rate, total layer thickness of the film, and melt volume rate (MFI) of the plastic or plastics used. It lies within the scope of the invention for the plastic melt to be supplied to the blow head and/or ring die and for the film tube to be extruded from the ring die in this method. In so doing, it is advantageous for the film tube to be extruded vertically in an upward direction. It is moreover within the scope of the invention for supply air to be supplied via the blow head for the purpose of inflating the film tube, advantageously by a supply air blower. It also lies within the scope of the invention for exhaust air to be suctioned out of the film tube, advantageously by at least one exhaust blower. The film tube is preferably removed by an extractor device, specifically one with a certain output speed. It lies within the scope of the invention for the blowup rate to correspond to the quotient of the diameter of the film tube and the diameter of the ring die. It is advantageous for the extruded film tube to be cooled by at least one cooler; specifically, blowing with cooling air is recommended. Here, the cooling air may particularly flow along the outer surface of the film tube.

Within the scope of the invention, at the beginning of operation and/or continuous operation of a system according to the invention, the input parameters are first set to the extent possible. Then, according to the invention, certain input parameters are measured and/or measured continuously fashion for the purpose of determining the output parameter, in particular for the purpose of detecting variations in the input parameters. In order to measure the input parameters, it is advantageous for corresponding measurement devices and/or measurement sensors to be provided. Thus, the blow head temperature and/or ring die temperature as well as the extruder temperature may be measured with a temperature sensor. Instead of the blow head temperature and/or ring die temperature, the melt temperature may also be measured as an input parameter. The measurement of the extruder speed may be made using a speed sensor and the measurement of the extruder torque as an input parameter may be conducted using a torque sensor. Likewise, it is advantageous for the extruder pressure to be measured using a pressure sensor. According to one variant embodiment, the output speed of the film tube may be determined from the rotational speed of the extraction rollers that are preferably used as a component of an extractor device. Corresponding measurement sensors may be used here as well. In order to determine the blowup rate of the film tube, the diameter of the film tube may be measured and the quotient of the diameter of the film tube and the diameter of the ring die may be calculated. The diameter of the ring die may be a fixed, predetermined system parameter (as an input parameter); however, this diameter may also be measured. Alternately, in order to determine the blowup rate, the width B of the flat film tube may be measured and used to calculate the diameter D of the film tube using the equation $D=2B/\pi$ and, subsequently, the quotient of the diameter D of the film tube and the diameter of the ring die may be calculated in order to determine the blowup rate. It is within the scope of the invention for the thickness and/or total layer thickness of the film to be continually measured in continuous operation, preferably in a contact-free manner. According to a recommended embodiment of the invention, the thickness and/or the total sheet thickness of the film is measured using a transmission technique and/or by a backscatter measurement technique.

According to another preferred embodiment of the method according to the invention, the reference parameter and/or the output parameter is the "width" and/or "width variation" of the film tube and then the input parameters for the purpose of determining the output parameter are selected from the group comprised of speed of the supply air blower, opening width or opening cross-section of the supply air supply, speed of the exhaust blower, and position of the inflated film tube. The speeds mentioned above are each preferably measured by a speed sensor. The opening width and/or the opening cross-section of the supply air supply may be a fixed, predetermined value or an opening width and/or opening cross-section to be measured in the course of the method according to the invention. The position of the inflated film tube is advantageously measured using corresponding position sensors.

Another preferred embodiment of the method according to the invention is characterized in that the plastic film and/or the film tube is extruded or coextruded as a multilayer film tube, in that, to this end, a plurality of extruders is used, in that the reference parameter and/or output parameter is the "distribution of individual layer thicknesses" of the multilayer film tube, and in that the input parameters are selected from the group comprised of blow head temperature and/or ring die temperature, extruder speeds, extruder torques, extruder temperatures, extruder pressures, output speed, total layer thickness, and inflation rate. In turn, the calculation and/or measurement of the input parameters occurs at least partially by suitable measurement devices and/or measurement sensors.

Moreover, a preferred embodiment of the method according to the invention is characterized in that the reference parameter and/or output parameter is the "package density" of the produced film package or wound film and in that the input parameters are selected from the group comprised of diameter of the winding shaft, wall thickness of the winding core, diameter of the film package, and theoretical diameter of the film package. In the coiler, it is advantageous for the film and/or the flat film tube to be wound on to the winding shaft by a winding shaft, specifically, onto a winding core placed or slid onto the winding shaft. The diameter of the winding shaft and/or the wall thickness of the winding shaft may be a fixed, predetermined input parameter or may be a parameter to be measured in the course of the method. The diameter of the film package is measured with a corresponding measuring device. The theoretical diameter of the film package is predetermined as a fixed input parameter for the calculation of the output parameter.

A preferred embodiment of the method according to the invention is characterized in that a plurality of reference parameters, namely at least two reference parameters, preferably at least three reference parameters, is/are provided and in that a plurality and/or large number of input parameters is measured, from which input parameters a plurality of output parameters is calculated corresponding to the reference parameters, and in that, in the case of a deviation of at least one calculated value of an output parameter from at least one value of the reference parameter, an anomaly of the output parameter is detected and preferably signaled. Upon the detection of the deviation and/or anomaly, the reaction may occur of the entire system being switched off and/or at least one system component being switched off and/or a control and/or regulation of adjustable parameters of the system and/or the system components.

As already discussed above, it is within the framework of the invention for the reference parameters and/or the values of the reference parameters to be measured during a reference operation and/or during a failure-free normal operation of the system. It has furthermore been stated that at least one reference parameter may also be specified as an experience-based parameter. Thus, it is possible within the scope of the invention for all reference parameters to be measured during a reference operation of the system or for some of the reference parameters to be measured during a reference operation of the system and for others of the reference parameters to be predetermined as experience-based parameters or for all fundamental reference parameters to be predetermined as experience-based parameters. According to one embodiment of the invention, a reference model is generated from a plurality of reference parameters. This reference model is effectively a classification model that is generated from the measurement data of the reference operation (failure-free normal operation). From a plurality or large number of input parameters, a plurality of output parameters is then calculated and, from this, an output model is calculated in turn. Upon the deviation of this output model from the reference model, an anomaly of the output model may be detected and/or signaled, which then allows a corresponding reaction thereto.

The analysis unit for obtaining at least one output parameter is advantageously at least one computer. The measured values of the input parameters may be transmitted to the analysis unit and/or computer in a wired or wireless fashion. The individual measuring devices and/or measuring sensors for the measurement of the input parameters are in and/or on the system components of the film-making system according to the invention. It is within the scope of the invention for the input parameters to be measured in a continuous or essentially continuously. A preferred embodiment of the invention is characterized in that at least a portion, in particular the better part of the input parameters and, according to a variant embodiment, all input parameters is/are measured continuously and, from this, the at least one output parameter and/or the output model is determined. It is advantageous for a sampling period to be used of 0.5 seconds to 10 minutes, preferably from 1 second to 1 minute, and preferably from 1 second to 10 seconds. According to one variant embodiment, a plurality and/or large number of measurement data flow into the analysis of each measured input parameter. Here, the measured value of the input parameter is generated, for example, from these measured values. In order to obtain the measured value of each input parameter, it is recommended for more than 20, preferably more than 30, and very preferably more than 100 measurement data and/or data points to be captured.

In order to obtain the object stated above, the invention further teaches a system for making a plastic film of a thermoplastic synthetic resin having a die for the extrusion of the plastic film, in particular having a ring die of a blow head for the extrusion of a film tube or having a flat film die for the extrusion of the film web, with at least one extruder being provided by which the plastic and/or the plastic melt may be conducted to the die, with the film tube and/or film web being extrudable from the die, with a cooler being present by which the extruded film tube and/or extruded film web is cooled, and moreover with a coiler being provided by which the removed and preferably flattened film tube and/or the removed film web may be wound into a film package and/or a wound film, with moreover at least one measuring device, in particular at least one measurement sensor, being provided for the measurement of input parameters, with the at least one measuring device and/or at least one measurement sensor being at the extruder and/or at the die and/or at a supply air supply and/or at an exhaust air discharge and/or at the extruded film tube and/or the extruded film web and/or at a cooler and/or at a conveyor and/or at a stretcher and/or at a coiler, with moreover at least one analysis unit being provided that is equipped with the requirement that at least one output parameter be determinable from the measured input parameters. According to a particularly preferred embodiment of the invention, the determined output parameter is compared to a reference parameter provided or the reference parameter provided. According to a recommended embodiment, at least one alarm is provided with which a deviation of the output parameter from the reference parameter may be signaled. The alarm is preferably furnished as a visual and/or acoustic alarm. It is within the scope of the invention for the analysis unit to be a computer. It is useful for a plurality of measuring devices and/or measurement sensors to be present for the measurement of the input parameters.

It is moreover within the scope of the invention for the die, in particular the ring die of a blow head, to be heatable and for the temperature of the die and/or the ring die to be measurable by at least one temperature sensor. At least one extruder is provided for supplying the plastic and/or the plastic melt to the die and/or to the ring die. It is advantageous for at least one cleaning screen to be interposed between the extruder and the die. According to one embodiment, at least one measuring device and/or at least one measurement sensor for the measurement of an input parameter is positioned at the at least one extruder and/or at the at least one cleaning screen. For the extrusion of a multilayer film, it is recommended for a plurality of extruders to be used.

In a film-blowing system that is preferred within the scope of the invention, the film tube is inflated at an inflation rate by supplied air after extrusion from the ring die, with the supplied air being supplied by at least one air supply and with the air supply having at least one supply air blower. The air supply is preferably at the blow head and the supply air is preferably blown through the blow head into the film tube. It is within the scope of the invention for exhaust air to be removed from the film tube via at least one exhaust air discharge device, this exhaust air discharge device having at least one exhaust air blower. The removal of the exhaust air preferably occurs through the blow head. According to one variant embodiment, a cooler provided within the scope of the invention is on the blow head, thus advantageously blowing cooling air onto the outer surface of the extruded film and/or the extruded film tube.

It is also within the scope of the invention, in the case of a preferably provided blown film-making system, for the film tube to be extruded from below from a blow head and/or from a ring die in a vertically upward direction and for the cooling air then preferably to be blown against the outer surface of the film web from below. In the case of a film tube that is extruded vertically upward, it is advantageous for the conveyor to be above the blow head. A conveyor used within the scope of the invention comprises at least two extraction rollers for the removal of the film and/or the film tube. It is within the scope of the invention for a film tube to be flattened at the conveyor. According to a variant embodiment, a reversing unit is used in conjunction with the removal of the film.

A coiler used within the scope of the invention for winding the film tube and/or the film web advantageously has a rotatable winding shaft. A winding core onto which the film or film web is wound and/or wound into a film package is preferably slid onto this winding shaft. After the winding is complete, the film package, including the winding core, is removed from the winding shaft of the coiler. It is recommended for a speed sensor to be present to measure the speed of the winding shaft.

The invention is based on the insight that the method according to the invention and the film-making system according to the invention offer a simple and cost-effective option for detecting and/or indicating a malfunction and/or anomaly in the film production in a functionally secure and precise fashion. Realizing these measures requires only relatively simple, low-complexity, and inexpensive system components. Upon the implementation of the measurements and analyses according to the invention, it is particularly possible for the operation of the system and/or the operation of system components to be stopped in a timely fashion if needed in order to prevent disadvantageous and serious damage to the system that could potentially lead to longer down times. Malfunctions and/or anomalies in the film-making system and/or in the performance of the film production method can be simply detected and indicated and/or signaled in an efficient, clear, and precise fashion. Due to the clear and rapid detection of deviations between the reference parameter and output parameters, it is possible to control and/or adjust system components as needed in a targeted fashion in order to counteract the deviations and/or anomalies and, if possible, return the system to its normal status. Overall, the measures according to the invention are characterized by low effort and low costs.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
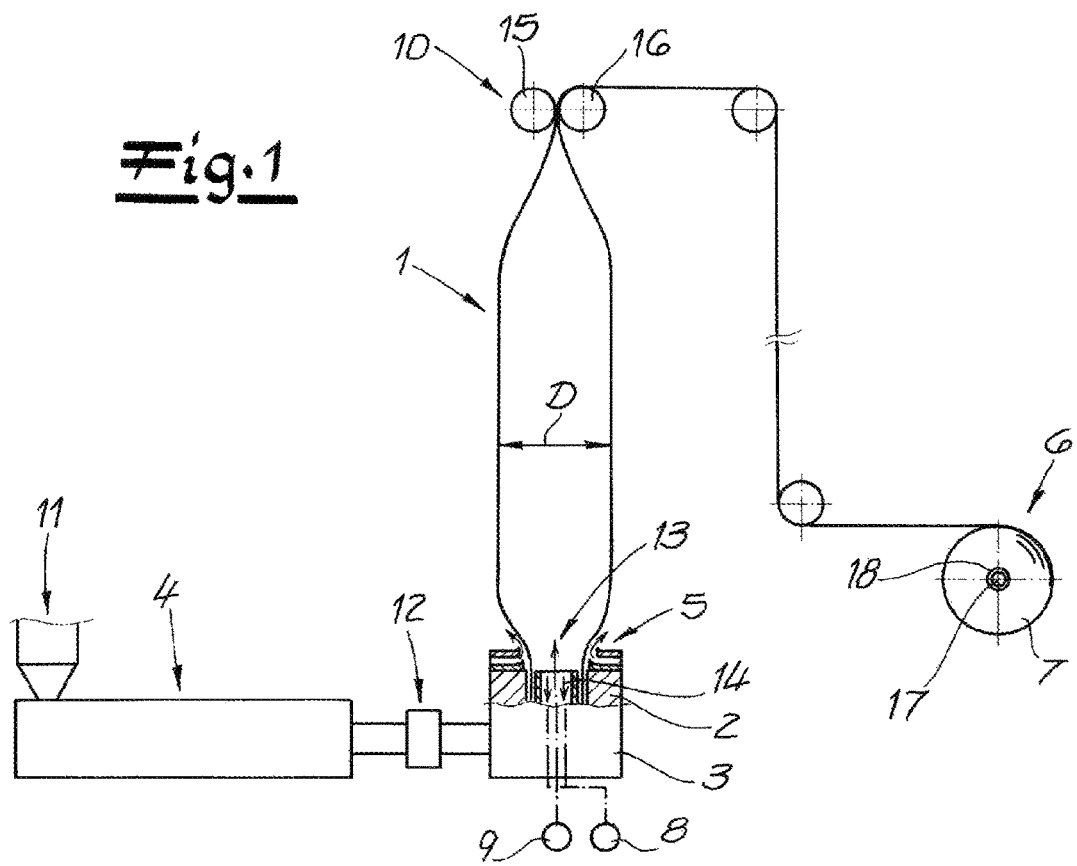
FIG. 1 is a vertical section through a film-blowing system for making a film tube according to the invention.

As seen in FIG. 1 a film-making system according to the invention is a film-blowing system for making a film tube 1 and/or a film web formed therefrom. Here, the film tube is extruded from a ring die 2 of a blow head 3. To this end, the plastic and/or the plastic melt is fed to the blow head 3 and/or the ring die 2 from an extruder 4. The extruded film tube 1 is preferably cooled by a cooler 5, removed by a conveyor 10, and flattened as well as wound into a film package 7 and/or a wound film by a coiler 6.

Advantageously, the plastic is supplied to the extruder 4 in the form of plastic granulate via a supply hopper 11. Using the extruder 4, the plastic melt is preferably conducted to the blow head 3 and/or to the ring die 2 by way of a cleaning screen 12. It is within the scope of the invention for the ring die 2 to be embodied in a heated fashion.

It is advantageous for the extruded film tube 1 to be inflated by supply air 13 or blown air introduced into the tube. To this end, a supply air blower 9 is advantageously provided. Moreover, exhaust air 14 is removed again from the film tube 1, specifically by an exhaust discharge system equipped with an exhaust blower 8. FIG. 1 shows that the film tube is extruded upward from below, such that the supply air 13 is also supplied from below, preferably and here via the blow head 3, and that the exhaust air 14 is removed downward, preferably and here through the blow head 3. According to a preferred embodiment and here, cooling air is supplied from below along the outer surface of the film tube 1 by the cooler 5.

The conveyor 10 for removing and flattening the film tube 1 has extraction rollers 15 and 16 here. This is shown in a purely schematic fashion and, naturally, other rollers, deflection rollers, and the like may be present here as well. In this context, a suitable reversing unit may be used as well. The flattened film tube 1 is supplied to the coiler 6 and, here, the film tube 1 is wound into the film package 7. To this end, the coiler 6 comprises a rotatable winding shaft 17 upon which a winding core 18 is slid. The film tube 1 or the film web is wound on to this winding core 18. After winding has been completed, the film package, including the winding core 18, is removed from the winding shaft 17 of the coiler 6.

Here according to FIG. 1, making a single-layer film or a single-layer film tube 1 is shown with only one extruder 4. In making a multilayer film, it is advantageous for a plurality of extruders 4 to be used.

Figure 2:
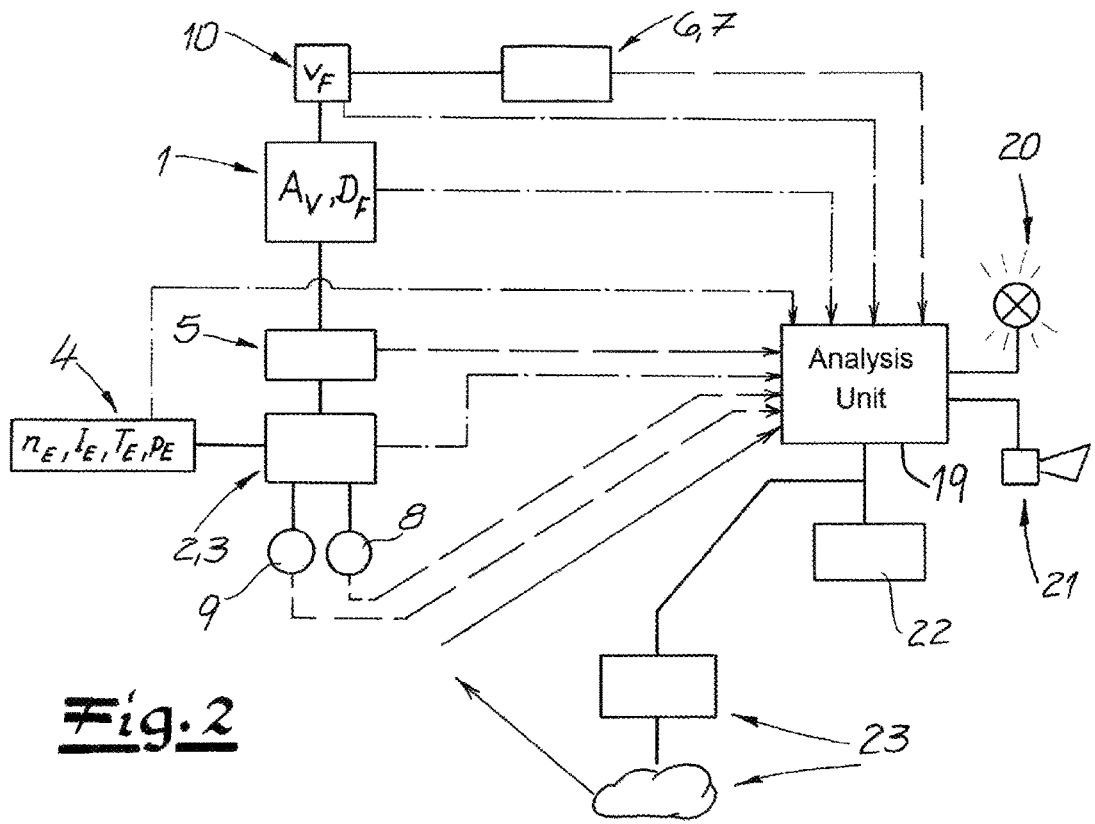
FIG. 2 is a schematic illustrating a method for carrying out the method according to the invention.

FIG. 2 schematically shows the method according to the invention, in particular for the determination of an output parameter. The same system components are given the same reference characters here as in FIG. 1. In the present case, the tensile strength of the produced film is to be determined as the output parameter. According to a preferred embodiment of the invention, the tensile strength of the film is first measured in a reference operation or in a failure-free normal operation of the system according to the invention. Here, it is within the scope of the invention for the tensile strength of the film to be measured off-line. To this end, the tensile strength of the film is determined according to the known norms during or after the failure-free normal operation of the system. The subsequent analysis is based on the tensile strength measured here as a reference parameter. Subsequently, the tensile strength is determined as an output parameter by input parameters and the tensile strength determined as an output parameter is compared to the reference value for tensile strength.

The input parameters of the extruder 4 are measured as the first input parameters in continuous operation of the system. These parameters are the extruder speed $n_E$ (speed of the extruder worm), the extruder torque $I_E$ (torque of the extruder worm), the extruder temperature $T_E$ (temperature in the extruder), and the melt pressure $p_E$ (pressure in the extruder). These input parameters are measured using corresponding measurement sensors, namely a speed sensor, a torque sensor, a temperature sensor, and a pressure sensor. The temperature $T_R$ of the ring die is also measured as an input parameter using a temperature sensor. Another input parameter is the blowup rate $A_V$ of the film tube 1. This parameter is determined using the quotient of the diameter of the inflated film tube 1 and the diameter of the ring die 2. As an alternative to the measurement of the diameter D of the film tube, the width B of the flattened film tube 1 may be measured and the diameter D of the film tube may be calculated using the formula $D=B/\pi$ and, in so doing, the quotient for the determination of the blowup rate AV may be determined. The output speed $v_F$ of the film tube 1 represents another input parameter. This parameter may, for example, be determined from the rotational speed of the extraction rollers 15, 16 and a corresponding measuring device may also be provided for determining the rotation speed. However, the output speed may also be predetermined for the input parameter as a fixed system parameter. Finally, the total layer thickness $D_F$ of the film and/or film tube 1 is used as an input parameter. This film thickness may be measured using a corresponding thickness measurement sensor. Here, the film thickness may, for example, be measured using infrared measurement, using ß-ray backscatter, or inductively.

According to a recommended embodiment of the invention, the seven input parameters $n_E$, $I_E$, $T_E$, $p_E$, $A_V$, $v_F$, and $D_F$ mentioned above are supplied to an analysis unit 19 embodied as a computer. Here, using the seven input parameters, the tensile strength is determined or calculated as an output parameter and the value of this output parameter is advantageously compared to the value of the tensile strength measured as a reference parameter. It is recommended for the measurements and/or determinations of the output parameters, the calculation of the output parameter from these input parameters, and the comparison of the value of the output parameter to the value of the reference parameter mentioned above to be conducted continuously during the operation of the system. In this manner, it is possible for a deviation between the tensile strengths of the output parameter and the reference parameter to be detected by the analysis unit 19 and, preferably, a significant anomaly occurring during the method is signaled. It is within the scope of the invention for the signaling to occur by a visual alarm 20 and/or by an acoustic alarm 21. The signaling of an anomaly may alternately or additionally be transmitted via an HMI 22 (human-machine interface) and/or by a cloud connection 23 (by email, SMS, and the like).

According to a recommended embodiment, the analysis proceeds as follows: first, a determination is made of which value set or value sets of input parameters, i.e. in the preferred embodiment, a set of seven values of seven input parameters, correspond to the value of the reference parameter measured in the failure-free normal operation. In the course of continuous operation of the system, the current value sets of input parameters that have been measured and/or determined are compared to the value set of input parameters corresponding to the reference value of the reference parameter. If a correspondence or a near correspondence is determined, it is advantageous for no alarm notification to occur. If a deviation and/or anomaly is determined, on the other hand, the deviation and/or anomaly is signaled and/or a corresponding alarm notification is signaled and/or transmitted.

The determination and/or signaling of a deviation/anomaly allows the operator of the system to switch off the system in a timely fashion, for example, to remove impurities or the like, and to subsequently restart production. This prevents damage to the system or longer, unanticipated down times. After the detection and/or signaling of an anomaly, it is also fundamentally possible for individual system components to be controlled with or without feedback in order to remove the anomaly and/or deviation.

We claim:

1. A method of making a plastic film of a thermoplastic synthetic resin in a film-making system by extrusion from a die of an extruder, the method comprising the steps of:
    melting the plastic and extruding the melted plastic from the die as a tube or web;
    forming the extruded tube or web into a package;
    providing two reference parameters selected from the group comprised of material density, bulk density, dosage amount, melt density of the melted plastic, feed rate, and material leakage;
    during continuous operation of the system, measuring by respective measuring devices two input parameters different from the reference parameter and selected from the group comprised of melt pressure, extruder temperature, extruder speed, extruder torque, and melt temperature;
    determining from the measured input parameters respective output parameters corresponding to the reference parameters;
    comparing the determined output parameters to the reference parameters; and
    on deviation of one of the output parameters from the respective reference parameter, signaling an anomaly of the detected deviant output parameter by a visual or acoustic signal.

2. The method defined in claim 1, further comprising the steps after signaling the anomaly of:
    documenting the anomaly, and
    storing the anomaly in an independent memory.

3. The method defined in claim 1, further comprising the step of:
    determining at least one of the reference parameters using at least one reference measurement device in a reference operation of the system or predetermining at least one of the reference parameters as an experience-based parameter.

4. The method defined in claim 1, further comprising the step of:
    predetermining at least one of the input parameters as a fixed or constant system parameter; and
    determining the other input parameters with a sensor in the system.

5. The method defined in claim 1, further comprising the steps of:
    calculating one of the reference parameters that forms the basis for the comparison with the respective output parameter or the at least one input parameter, and
    including this calculated input parameter in the determination of the output parameter.

6. The method defined in claim 1, wherein the film-making system is a film-blowing system in which the plastic film is extruded from a ring die of a blow head as a film tube, the method further comprising the steps of:

inflating and then stretching the film tube in an extrusion direction and transversely to the extrusion direction, the reference parameter and/or output parameter being at least one parameter from the group comprised of malleability of the film and tensile strength of the film, the input parameters being selected from the group comprised of blow head temperature or ring die temperature, extruder speed, extruder torque, extruder temperature, extruder pressure, output speed, blowup rate, total layer thickness of the film, and melt volume rate of the plastic or plastics used.

7. The method defined in claim 6, wherein the reference parameter or output parameter is a width or a change in width of the film tube and the input parameters are selected from the group comprised of speed of a supply air blower, opening width or opening cross-section of the supply air supply, speed of an exhaust blower, and position of the inflated film tube.

8. The method defined in claim 1, wherein the plastic film is extruded or coextruded as a multilayer film by a plurality of extruders, the reference parameter or output parameter is the distribution of individual layer thicknesses of the multilayer film, and the input parameters are selected from the group comprised of die temperature, extruder speeds, extruder torques, extruder temperatures, extruder pressures, output speed, total layer thickness, and inflation rate.

9. The method defined in claim 1, wherein the reference parameter or the output parameter is a package density of the package or a coil of the film and the input parameters are selected from the group comprised of diameter of a winding shaft, wall thickness of a winding core, diameter of the film coil, and theoretical diameter of the film coil.

10. The method defined in claim 1, further comprising the steps of:

generating a reference model from the plurality of reference parameters;

generating an output model from the plurality of input parameters; and signaling an anomaly on deviation of the output model from the reference model.

11. The method defined in claim 1, wherein the steps of measuring, determining, and comparing are carried out continuously as the film is extruded from the die.

* * * * *